United States Patent [19]

Debe et al.

[11] Patent Number: 4,950,579

[45] Date of Patent: Aug. 21, 1990

[54] OPTICAL DISC RECORDING MEDIUM HAVING A MICROSTRUCTURE-DERIVED INHOMOGENEITY OR ANISOTROPY

[75] Inventors: Mark K. Debe, Stillwater; Kam K. Kam, Woodbury; Daniel R. Field, St. Paul, all of Minn.

[73] Assignee: Minnesota Mining and Manufacturing Company, St. Paul, Minn.

[21] Appl. No.: 216,905

[22] Filed: Jul. 8, 1988

[51] Int. Cl.⁵ .................... G03C 1/73; G03C 1/735; G03C 5/00
[52] U.S. Cl. .................... 430/270; 430/346; 430/495; 430/945; 430/271
[58] Field of Search ............... 430/270, 945, 271, 495, 430/346

[56] References Cited

U.S. PATENT DOCUMENTS

| | | | |
|---|---|---|---|
| 3,903,107 | 9/1975 | Griffiths et al. | 540/139 |
| 4,218,689 | 8/1980 | Bloom et al. | 346/135.1 |
| 4,219,826 | 8/1980 | Bloom et al. | 346/135.1 |
| 4,241,355 | 12/1980 | Bloom et al. | 346/135.1 |
| 4,298,975 | 11/1981 | van der Veen et al. | 369/94 |
| 4,422,159 | 12/1983 | Craighead et al. | 365/127 |
| 4,458,004 | 7/1984 | Tanikawa | 430/270 |
| 4,471,039 | 9/1984 | Borsenberger et al. | 430/58 |
| 4,492,750 | 1/1985 | Law et al. | 430/494 |
| 4,551,413 | 11/1985 | Bell | 430/270 |
| 4,551,828 | 11/1985 | Chung | 369/275 |
| 4,556,893 | 12/1985 | Rinehart et al. | 346/135.1 |
| 4,725,525 | 2/1988 | Kenney et al. | 430/270 |
| 4,748,053 | 5/1988 | Okada | 430/270 |

OTHER PUBLICATIONS

Chemical Abstracts, CA 105:181643s, Ueno et al., 1986.
Chemical Abstracts CA95 (4): 32694g, Chien et al., 1981.
Thin Solid Films, 151, (1987), L109–L110.
N. A. Plate et al., "Comb-Shaped Polymers and Liquid Crystals", Plenum Press, NY (1987), pp. 376–379.
"Proceedings of the Symposium on Optical Storage Materials" *Journal of Vacuum Science & Technology*, vol. 18(1), Jan./Feb. (1981) 63–110.
"Polymeric Optical Disk Recording Media", *CRC Critical Reviews in Solid State and Materials Sciences*, vol. 13, Issue 1, pp. 1–26 (1986) (cited in the specifications as "Critical Reviews").
M. D. Croucher and M. A. Hopper, "Materials for Optical Discs", *Chemtech*, Jul., pp. 426–433, (1981).
"Erasable Optical Discs", *Popular Science*, May, 1987, pp. 56–59 and 101–102.

Primary Examiner—Paul R. Michl
Assistant Examiner—Christopher D. RoDee
Attorney, Agent, or Firm—Donald M. Sell; Walter N. Kirn; Lorraine R. Sherman

[57] ABSTRACT

An optical recording medium and a method for preparing the medium in which information can be recorded and read by means of a focused modulated laser beam. The optical recording medium comprises a substrate containing on at least one surface, a layer of organic material having an anisotropic and/or inhomogeneous physical microstructure which gives the layer a non-uniform density gradient along the direction perpendicular to the plane of the layer before exposure to a laser beam, whereby upon exposure to electromagnetic radiation the level of anisotropy and/or inhomogeneity is reduced.

25 Claims, 10 Drawing Sheets

 LASER EXPOSURE

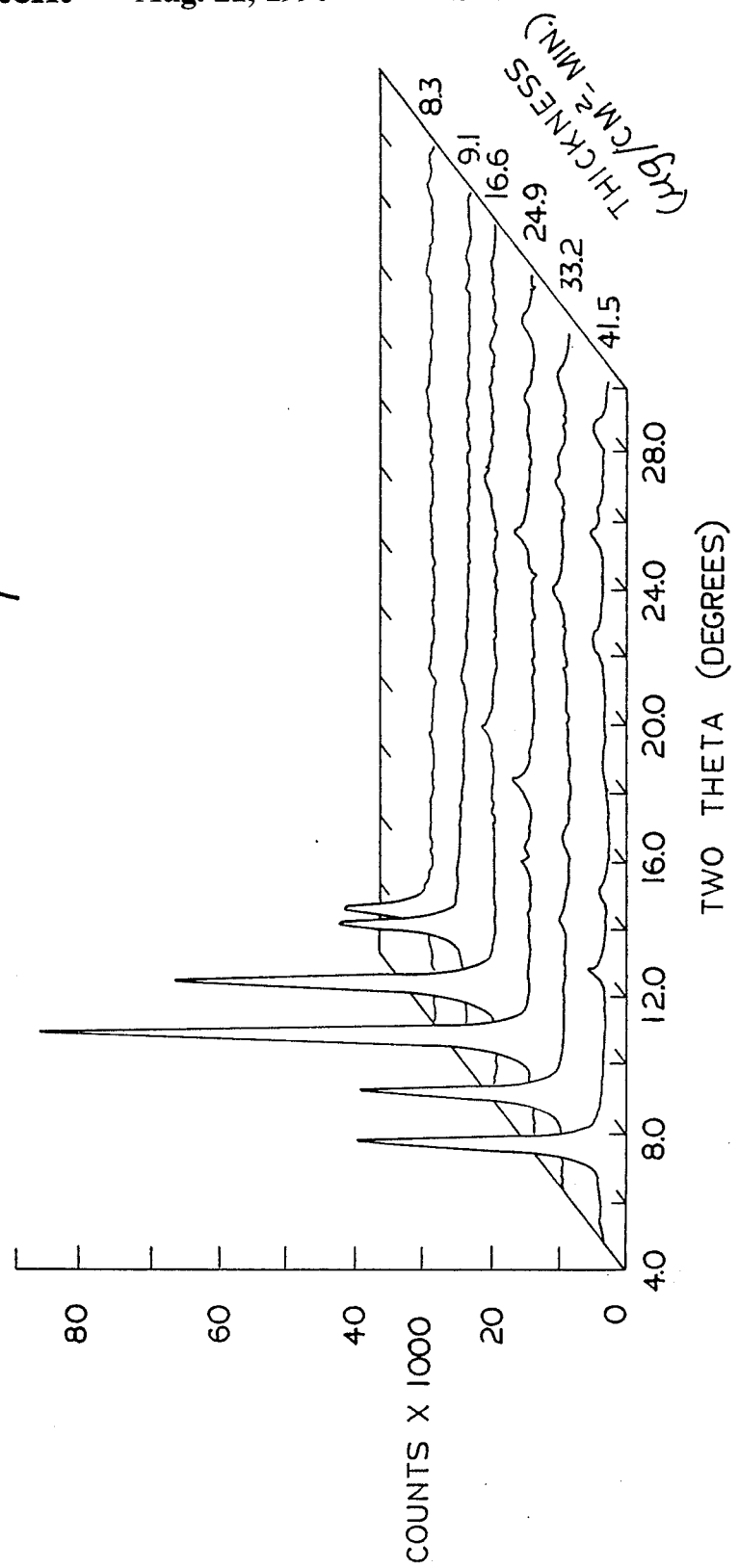

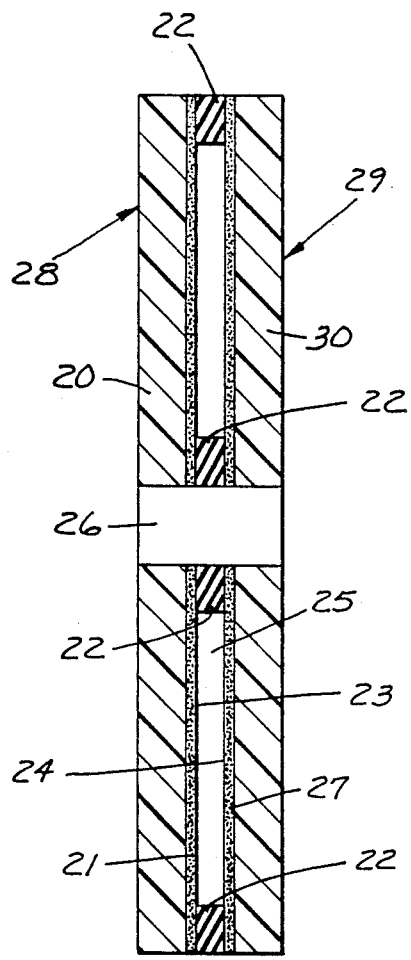
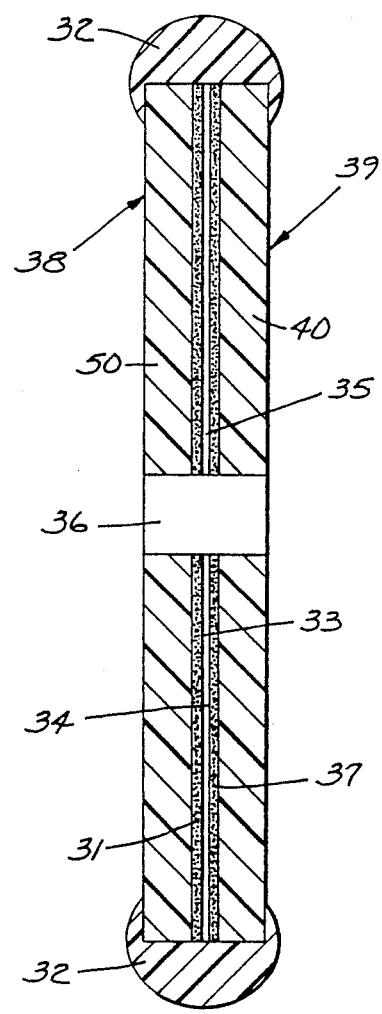
Fig. 10A
Fig. 10B

OPTICAL DISC RECORDING MEDIUM HAVING A MICROSTRUCTURE-DERIVED INHOMOGENEITY OR ANISOTROPY

FIELD OF THE INVENTION

This invention relates to an optical recording medium which is recordable by a focused, modulated electromagnetic radiation beam, such as a radiation beam from a laser. In another aspect, this invention relates to an optical recording disc assembly comprising at least one recording medium, each medium comprising a layer on a support. In a further aspect, a method is disclosed for providing the medium of the invention.

BACKGROUND OF THE INVENTION

Use of a highly focused laser beam for optical recording permits the storage of very large quantities of information at extremely high data rates and also allows for rapid random access to segments of the data during playback of information. Applications of this technique are many and the background art has taught optical information storage media wherein the recording process comprises thermal deformation of a homogeneous layer, involving physical and/or chemical means such as pits, recessed areas, and hole forming, bubble and protuberance forming, ablating, subliming, melting, fusing, softening, coloring or discoloring, and the like. Many of these processes are described in "Proceedings of the Symposium on Optical Storage Materials," in the *Journal of Vacuum Science & Technology*, Vol. 18(1), Jan/Feb (198163-110. "CRC Critical Reviews", *Solid State and Material Sciences*, Volume 13, Issue 1, (1986) pages 1-26 reports four laser writing modes, deep pit, shallow pit, bubble formation and optical property change. While the first three modes are destructive, the last involves some optically detectable chemical or physical change in the recording medium without topological disruption of the layer. This article states that "although several examples of such recording media exist among the inorganics,—there are no reported cases of all-organic media that function by this mechanism." *Critical Reviews*, p.12-13. These and other state-of-the-art means, including ablating, detexturing, phase changing, alloying, particle coalescing, vesicular or bubble forming, have also been described by M.D. Croucher and M.A. Hopper, "Materials for Optical Discs," in *Chemtech*, July, 426-433 (1987).

U.S. Pat. Nos. 4,725,525, 4,556,893, 4,551,828, 4,551,413, 4,241,355, 4,492,750, 4,298,975, 4,219,826, and 4,218,689 teach thermally deforming products and processes.

An article, "Erasable Optical Discs" in *Popular Science*, May, 1987, pp. 56–59, and 101-102, illustrates phase-change recording, wherein a typical tellurium-based layer can be continuously switched from a crystalline to a noncrystalline or amorphous state by heating with a proper laser.

U.S. Pat. No. 4,422,159 teaches an optical recording structure which includes connected and disconnected voids which upon laser exposure melt to alter the optical properties of the treated region.

In all the prior art patents, it is either stated explicitly or shown implicitly in the drawings that any or all of the recording layers are uniformly homogeneous and isotropic in their material properties before the recording process, but after the recording process are anisotropic and inhomogeneous along the direction perpendicular to the layer plane by virtue of ablation and/or deformation occurring upon exposure to the laser beam.

SUMMARY OF THE INVENTION

Briefly, the present invention provides an optical recording medium for use with an optical recording and playback apparatus, by which the medium receives electromagnetic radiation to record information, the medium comprising a substrate, and containing on at least one surface of the substrate at least one layer of organic material which prior to exposure to radiation has a physical microstructure which is uniaxially anisotropic such that at least 10% of all the molecules preferably 50% of the molecules of the organic material are uniformly preferentially oriented within ±15 degrees of an arbitrary angle relative to the plane of the layer and providing to the layer a refractive index profile which is anisotropic with respect to the direction perpendicular to the plane of the layer before exposure to radiation, and whereby upon exposure to electromagnetic radiation the level of anisotropy is reduced such that at least 5% fewer of the molecules remain preferentially oriented.

In another aspect, the layer of organic material may have a physical microstructure which is inhomogeneous and providing to the layer a non-uniform density, the density constituting a physical density gradient along the direction perpendicular to the plane of the layer before exposure to radiation, and whereby upon such exposure the extent of the density gradient is reduced to enable subsequent optical detection of recorded information.

In a further aspect, the present invention provides a method for preparing such an optical recording medium which is anisotropic and/or inhomogeneous along the direction perpendicular to the plane of the organic layer. This is in contrast to the prior art which taught only recording media comprising homogeneous and/or isotropic single layer properties.

In still another aspect, the present invention teaches the methods for preparing two embodiments of the optical recording disc assembly. The first embodiment comprises at least one single layer of organic material on a support. The second embodiment comprises an optical recording disc assembly comprising transparent substrates and a first and second organic recording media wherein the first medium is configured to face the second medium and wherein the surface of the organic layer of the first medium is separated from the surface of the organic layer of the second medium by a gap of at least two wavelengths of the desired electromagnetic recording radiation.

In contrast to the art disclosed in the background above, this invention teaches a recording medium having at least one recording layer which before the recording process is initially anisotropic and/or inhomogeneous in its physical properties, but after the recording process, is less anisotropic and/or less inhomogeneous along the direction perpendicular to the layer plane, approaching having optical properties which are homogeneous and isotropic by exposure to a focused beam of radiation by a non-ablation or non-layer deforming mechanism.

The method of preparing the recording medium of the present invention preferably comprises vapor depositing a thin layer of organic material onto a substrate while controlling the substrate temperature and the deposition rate. By controlling both the substrate temperature and deposition rate, an organic layer is obtained which is anisotropic and/or inhomogeneous in its physical characteristics.

As used in this application:

"physical microstructure" means the layer's structural characteristics, independent of its chemical composition, including, but not limited to the local density at any arbitrary point within the layer, the size, shape and orientation of crystalline or noncrystalline grains comprising the layer, the type of crystalline polymorph defining the crystalline regions, and the orientation of nonspherical molecules comprising the organic material relative to the substrate;

"inhomogeneous" means that the physical microstructure characteristics vary from point to point within the layer, especially along the direction perpendicular to the plane of the layer;

"anisotropic" means that the layer's physical microstructure characteristics are dependent on direction and in particular are different along the direction perpendicular to the plane of the layer but are constant in a direction parallel to the plane of the layer.

"refractive index" of a medium means the ratio of the velocity of light in a medium and that in air and is represented by $N=n+ik$, wherein N refers to the complex refractive index describing the propagation of light through a material, where n is the real component of the complex refractive index, k is the imaginary component of the complex refractive index, and k describes the ability of the material to absorb radiation such that the higher the value of k, the more strongly the medium absorbs radiation, and $i=\sqrt{-1}$;

"refractive index profile" means the mathematical curve depicting the variation of the refractive index within the layer along the direction perpendicular to the plane of the layer;

"gradient index of refraction profile" means the slope of the refractive index profile;

"void fraction" means the proportion of the material medium contained within an arbitrary volume and which consists only of air or vacuum and is devoid of solid material;

"layer" means a layer of material having a thickness between 10 nm and 2000 nm and/or a mass per unit area "thickness" between 1.5 $\mu g/cm^2$ and 300 $\mu g/cm^2$;

"density gradient" means a layer has a density that varies over the thickness of the layer, from greatest density at the substrate interface to least density at the air interface, the density varying by at least 10% compared to the average layer density;

"interface" means the two dimensional surfaces parallel to the surface of the layer where the layer contacts an adjoining medium;

"isotropic" means that the material properties are the same in all directions.

The anisotropy and/or inhomogeneity of the physical microstructure can be characterized for example, by "scanning electron microscopy" (SEM), "reflection absorption infrared spectroscopy" (RAIR), or "X-ray diffraction" (XRD) or combination thereof.

BRIEF DESCRIPTION OF THE DRAWINGS

FIG. 2 is a schematic diagram showing how the physical microstructure can be anisotropic and/or inhomogeneous before recording, but more isotropic or more homogeneous after exposure to the laser beam, causing the refractive index profile to change. FIG. 2C shows a homogeneous and isotropic layer after laser exposure while

FIG. 5 shows external reflection absorption infrared (RAIR) spectra from.

FIG. 10A shows one disc assembly of the recording medium in which two media are separated by a spacer.

FIG. 10B shows a second disc assembly in which the two media are separated by a gap of two wavelengths of the recording radiation.

DETAILED DESCRIPTION AND SPECIFICATION OF THE INvENTION

Figure 1:
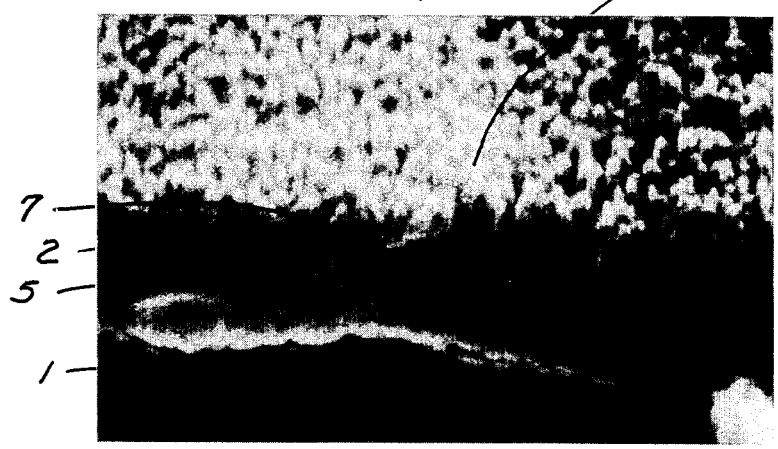
FIG. 1 is a scanning electron micrograph (SEM, 50,000×magnification) of a coated disc taken at a 45 degree viewing angle of the cleaved edge of the substrate and a thin layer coating of vapor deposited vanadyl phthalocyanine (VOPc).

In a preferred embodiment, the present invention provides an optical recording and playback medium adapted for use with an optical recording apparatus, by which the medium receives electromagnetic radiation to record information, comprising a substrate on which is vapor deposited at least one laYer of organic material having a physical microstructure which prior to exposure to such radiation is uniaxially anisotropic such that at least 10% of all the layer molecules, preferably 50% of the molecules, are uniformly preferentially oriented within ±15 degrees of an arbitrary angle relative to the perpendicular direction to the plane of the layer. Upon exposure of the layer to electromagnetic radiation, the level of anisotropy is reduced such that at least 5% fewer of the molecules remain preferentially oriented. This change in physical microstructure results in a change in the layer's refractive index profile as evidenced by a change in the medium's optical properties.

The substrate, which can be rigid or flexible, may be comprised of either optically transparent or non-optically transparent materials including metals, ceramics, polymers and polymeric webs. In the preferred embodiment, the substrate may be an organic or inorganic material which is substantially optically transparent over the wavelength range of 300 to 900 nm.

The layer on the substrate having such anisotropy and/or inhomogeneity can comprise any organic compound having molecules which are capable of being deposited to provide layers which are anisotropic and/or inhomogeneous and/or which have high absorption coefficient for absorbing electromagnetic radiation such as radiation from a laser beam. Lasers useful in the present invention include any laser emitting radiation in the range of 100 nm to 15 micrometers. There can be one or more layers of different organic compounds coated over each other. In a preferred embodiment, the organic layer comprises organic dyes and pigments having nonspherical molecules, particularly those exhibiting adequate thermal stability to be vacuum sublimed without decomposing. The compounds of many useful organic dyes and pigments have planar configurations. Some organic molecules meeting the requirements of nonspherical molecules include commercially available dyes and pigments such as vanadyl phthalocyanine, lead phthalocyanine, INDANTHRENE GOLDEN YELLOW G.K. (generic name C.I. VATYELLOW 4 (C.I. 59100)), AMANTHRENE RED FBB (generic name C.I. VATRED 10 (C.I. 6700)), etioporphyrin I, synthesized by the method described by Rislove et al., *Journal of Chemical and Engineering Data* 13(4) p588 (1968), and vanadyl etioporphyrin I synthesized by the method described by Rislove, Winona State University, Chemistry Department (1988) as described in Example 9 below. In one embodiment the optical recording medium comprises a substrate onto which is coated a thin layer of crystalline vanadyl phthalocyanine, the layer having a thickness in the range of 1.5 to 300 $\mu g/cm^2$, preferably 5 to 160 $\mu g/cm^2$. This thickness is representative of useful thicknesses of any organic recording layer.

The vapor-deposited layer consists of discrete, often preferentially oriented anisotropic grains. Within these grains the molecules are packed with varying degrees of crystallinity according to the particular polymorph produced by the given deposition conditions. The chromophoric dipole moments responsible for the light absorption depend intrinsically on the polymorph and degree of crystallinity, as well as the orientation of the molecules within the grains. The polymorphic crystal form determines the magnitude of the optical dipole moment vector, p, while the orientation of the molecules relative to the surface, and hence the electromagnetic electric field vector, E, within the layer determines the magnitude of the coupling of the dipole moment vector with the E field vector through a vector dot product, p*E. Changes in either or both of these physical microstructure characteristics can cause the optical response of the layer to change without any overt change in the surface morphology. Since both the crystalline form, and the orientation of the grains and their molecules change as a function of deposition conditions, each of these physical structure characteristics will cause the material properties of the layer to be uniaxially anisotropic.

This invention further teaches a method for controlling the initial refractive index profile of a vapor deposited organic layer by controlling the inhomogeneity of the physical density and/or anisotropy of the physical microstructure of the layer. In a preferred embodiment a method is disclosed for depositing onto a substrate a thin layer of oriented crystalline vanadyl phthalocyanine (VOPc). A method is provided wherein by controlling the anisotropy and/or inhomogeneity of the initial physical microstructure of an organic layer during deposition, a recording medium is produced in which the anisotropy and/or inhomogeneity is reduced during recording.

Unlike the media of the background art, the media of the present invention do not depend on physical deformations such as pits, holes and bubbles of an initially homogeneous and/or isotropic recording layer in order to cause the optical properties of the media to change. The "physical microstructure" of the layer as used in this invention refers to more than merely the surface topography, thus, the refractive index profile depends on more than this source of inhomogeneity. Any anisotropy of the material properties of the vapor-deposited layer can be utilized to record optical information.

The desired level of anisotropy and/or inhomogeneity of the layer is preferably achieved by controlling the vapor deposition process. By controlling both the substrate temperature and the deposition rate, the degree of anisotropy and/or inhomogeneity can be effectively controlled. The substrate temperature during deposition, and the deposition rate, are deposition parameters which can be used to affect the resulting anisotropy of the physical microstructure. The substrate temperature in particular is known to be important for controlling the degree of preferential orientation of the nonspherical molecules relative to the substrate. For example, it is generally known in the art that by controlling substrate temperature to within the range of $0.31T_b$ to $0.35T_b$, where $T_b$ is the boiling point of the organic material being deposited measured in degrees Kelvin, the physical microstructure of the layer can be controlled. Both the polymorph into which the grains have crystallized, and the preferential orientation of the molecules relative to the substrate can be controlled by the deposition conditions.

As the level of anisotropy and/or inhomogeneity is changed, the layer's optical properties such as its reflectivity or transmittance also change. By exposing this initially anisotropic and/or inhomogeneous layer to laser radiation, a more homogeneous and more isotropic physical microstructure is produced which exhibits a refractive index profile different from that of the unexposed layer. More significantly, this change in the layer's optical properties is obtained without thermal deformation such as ablation or hole-forming.

FIG. 1 shows an SEM of a cleaved edge of a vapor deposited layer of VOPc on a polycarbonate substrate 1 taken at a 45 degree viewing angle, clearly displaying a highly developed topological microstructure consisting of oriented, anisotropic grains 7 which emanate from what appears to be a denser region 2 of material close to the polycarbonate/organic layer interface 5. The layer is seen to possess a considerable void fraction at the layer/air interface 3. Within a hypothetical plane cutting through the crystallites of the organic layer near the layer/air interface 3, the layer material consists of a mixture of organic material and air, while at the polycarbonate surface 5, the layer is much denser. Expressed as a function of position within the layer along an axis normal to the surface, the mean density of the layer thus changes from dense at the bottom of the organic layer, to less dense at the top of the crystallites.

The average void fraction and its variation with depth within the layer can be estimated from the SEM micrograph. In FIG. 1 it can be visually estimated that the top-most region of the VOPc layer is a mixture of 50% grains and 50% void, whereas at the polycarbonate interface the layer grains appear contiguous with very little void space resolvable in the SEM. It can be estimated that the local layer density at the air/layer interface is one half that at the layer/substrate interface with the density varying approximately linearly in between.

The average density of the layer can be estimated by comparing the layer thickness with the mass per unit area determined during the layer deposition. For example, in FIG. 1 the SEM-determined layer thickness is 380 nm for a quartz crystal oscillator-measured mass of 16 $\mu g/cm^2$. This implies an average density of 0.42 $g/cm^2$ for the organic layer. This is approximately one-third the bulk density of VOPc organic material. It can be estimated that the local layer density varies from at least 0.56 $g/cm^2$ at the substrate interface to 0.28 $g/cm^2$ at the air interface. In general, the organic layer has an average density which is not less than 10% and not greater than 90% of the maximum bulk density of the organic material. The local layer density at the substrate interface can be any value between 10% above the average layer density, to a value equal to the bulk density of the organic material. At the air interface the local layer density can be any value between zero and 10% below the average layer density.

Figure 2B:
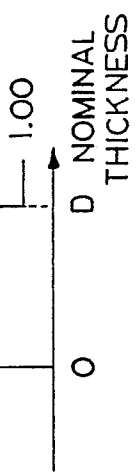
FIG. 2A is an inhomogeneous layer exhibiting a density gradient and FIG. 2B is the corresponding gradient refractive index profile.
Figure 2D:
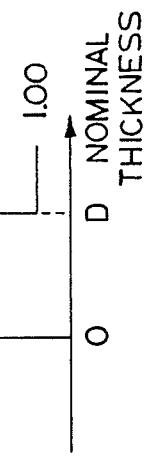
FIG. 2D depicts the corresponding uniformly constant refractive index profile.

This density gradient will cause the layer to exhibit a similar gradient in its optical index of refraction because the refractive index of air, 1.0, is considerably different from that of the organic material, which has both real and imaginary refractive index components. This concept is illustrated in FIG. 2A and 2B, in which it is shown that the gradient index profile can derive from an inhomogeneity of the layer such as a density gradient since the local refractive index at a point within the layer is the density weighted average of the refractive index of the bulk material fraction and the void fraction at that point. Generally, the average refractive index is a value not less than 10% and not greater than 90% of the maximum refractive index of the organic material.

Figure 2F:
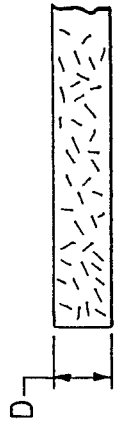
Figure 2A:
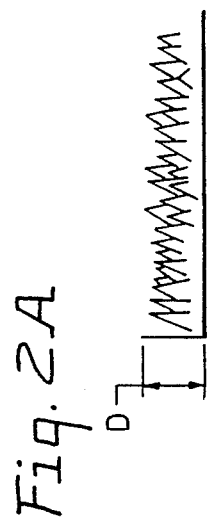
Figure 2C:
Figure 2E:
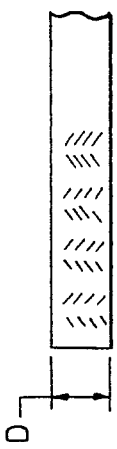
FIG. 2E shows an anisotropic layer, consisting of preferentially oriented nonspherical molecules, which is converted after laser exposure to a homogeneous and isotropic layer as shown in FIG. 2F.

FIGS. 2E and 2F illustrate the changes in physical microstructure which results when the initially anisotropic organic layer, FIG. 2E is exposed to radiation.

Figure 3:
FIG. 3 is a scanning electron micrograph (SEM, 50,000×magnification and 84 degree viewing angle) showing a cross-sectional view of a coated disc similar to FIG. 1, through a smooth, homogeneous area which was written by a laser at about 14 mW incident power.

FIG. 3 shows a cross-sectional view of a laser-written spot of the layer described in FIG. 1. After a high power exposure to 14 mW, a comparison with FIG. 1 illustrates the extreme of the changes which can be induced in the physical microstructure of the organic layer of the present invention. It is clear that the material in the imaged region 9 has not ablated or formed a hole or pit, but rather has apparently formed a glassy looking, more homogeneous and isotropic region. The effective density profile has been significantly changed from a gradient before laser exposure to a constant value after exposure. This concept is illustrated in FIGS. 2C and 2D where it is observed that the homogeneous material properties cause the refractive index to be constant throughout the layer thickness. This change in the refractive index gradient can produce a significant increase in the layer's reflectivity of at least 10% when viewed from the substrate side of the recording medium. This is exactly opposite to the reflectivity change of single layer ablative recording media of the background art which use a homogeneous layer, for which the reflectivity decreases as the layer material is removed, and in the limit, approaches that of the bare substrate. Furthermore, air incident media typically use a reflector layer between substrate and light absorption layer which is not necessary for the recording medium of the present invention.

Figure 5A:
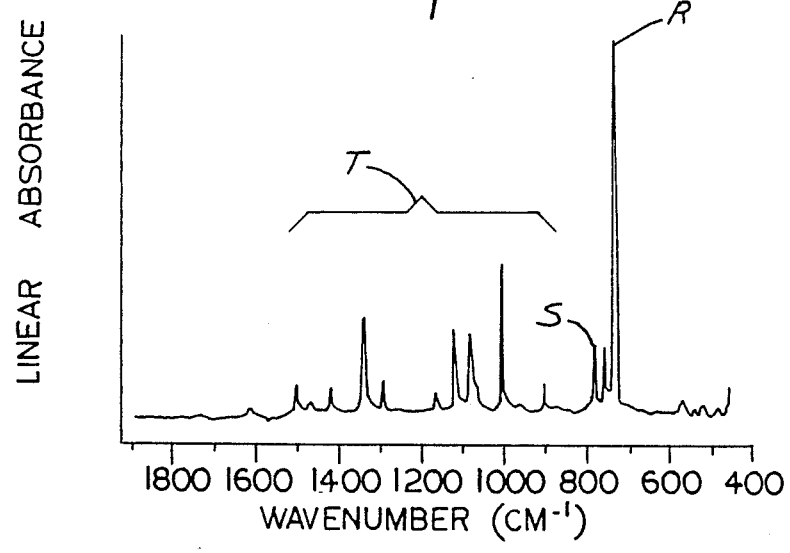
FIG. 5A a VOPc layer vapor deposited onto a cooled substrate, FIG. 5B a substrate maintained at room temperature, and FIG. 5C a KBr pellet (comparative) transmission spectrum of the same material.
Figure 5B:
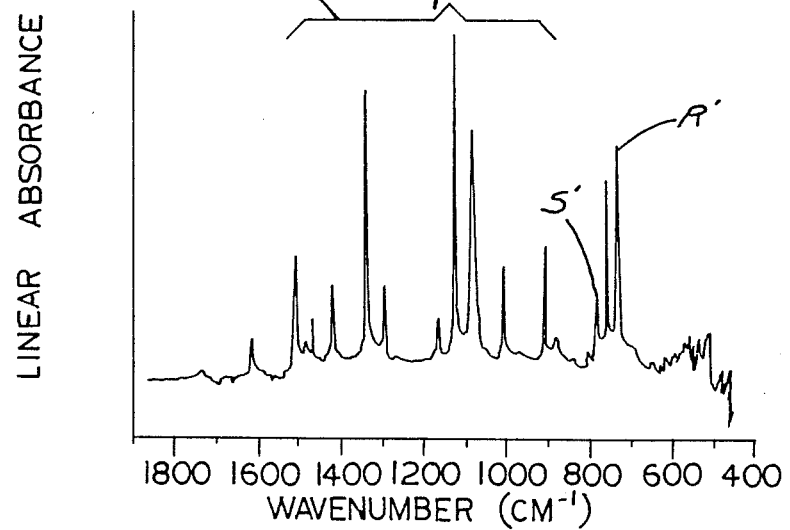
Figure 5C:
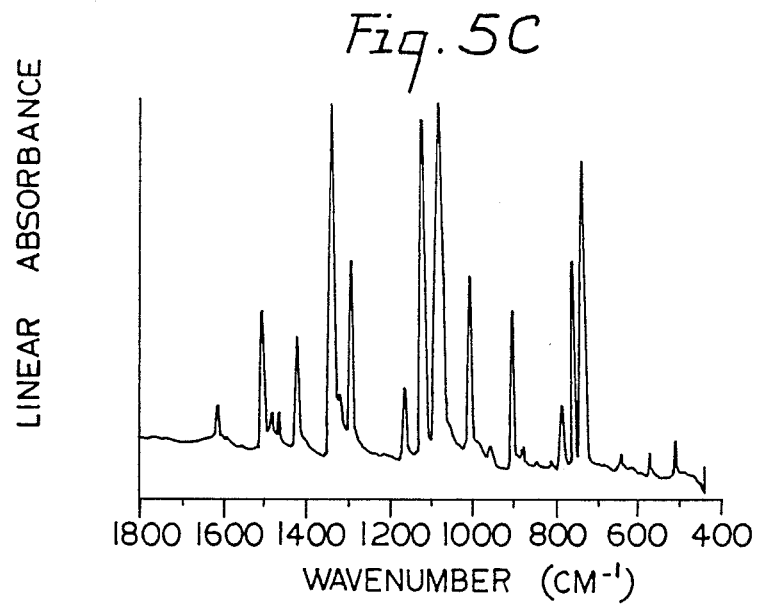

To show that the molecules of the organic layer can be preferentially oriented, FIGS. 5A and 5B compare the external reflection-absorption infrared (RAIR) spectra from sample layers of VOPc deposited onto cooled and uncooled substrates, respectively. In the RAIR spectrum of FIG. 5A the out-of-plane bands R and S have larger relative intensities than the in-plane bands T, when compared to the uncooled sample spectrum of FIG. 5B. This shows that the planes of the molecules are preferentially-oriented in the layer of FIG. 5A, more parallel to the substrate than they are perpendicular to the plane of the substrate. The substrates were copper coated glass slides which were thermally attached to cooled and uncooled polycarbonate optical disc blanks for coating with VOPc. The use of reflection-absorption infrared spectroscopy for determining the orientation of molecules on metal surfaces has been extensively discussed by M.K. Debe in *Progress in Surface Science* 24(1–4), 137–178 (1987). The relative band intensities of the out-of-plane vibrational modes are seen to be considerably enhanced relative to the bands with in-plane symmetry in the cooled substrate spectra when compared with the KBr reference spectrum in FIG. 5C. As discussed in the above reference this change in intensity shows that the molecular planes are preferentially oriented more parallel to the substrate in the cooled substrate samples. Measurements of the substrate incident reflectivity showed the as-deposited reflectivity of the cooled substrate grown layer was lower than that of the uncooled substrate grown layer. Upon exposure to the laser beam, the anisotropy was removed, causing a larger reflectivity increase for the cooled, anisotropic layer than for the uncooled, isotropic layer. For nonspherical molecules such as the phthalocyanines it is possible to use the infrared band intensities to quantitatively determine the degree of anisotropy in the layer in terms of an order parameter, f, between 0 and 1, where a value of zero means that the molecules in the layer are completely randomly oriented, and a value of 1 means that the molecules are 100% uniformly oriented in some preferred direction relative to the substrate. If the relative band intensities in the RAIR spectrum from the layer are the same as those in the transmission spectrum from the KBr pelletized sample, shown in FIG. 5C, then a value of f=0 is implied. As the RAIR band intensities become more and more unbalanced, as seen in FIG. 5A, the value of f approaches 1. For example, from FIG. 5A it can be estimated that at least 20% more of the molecules of the VOPc layer have a preferred orientation with respect to the plane of the layer when compared to the randomly oriented molecules shown in FIG. 5C.

Figure 6A:
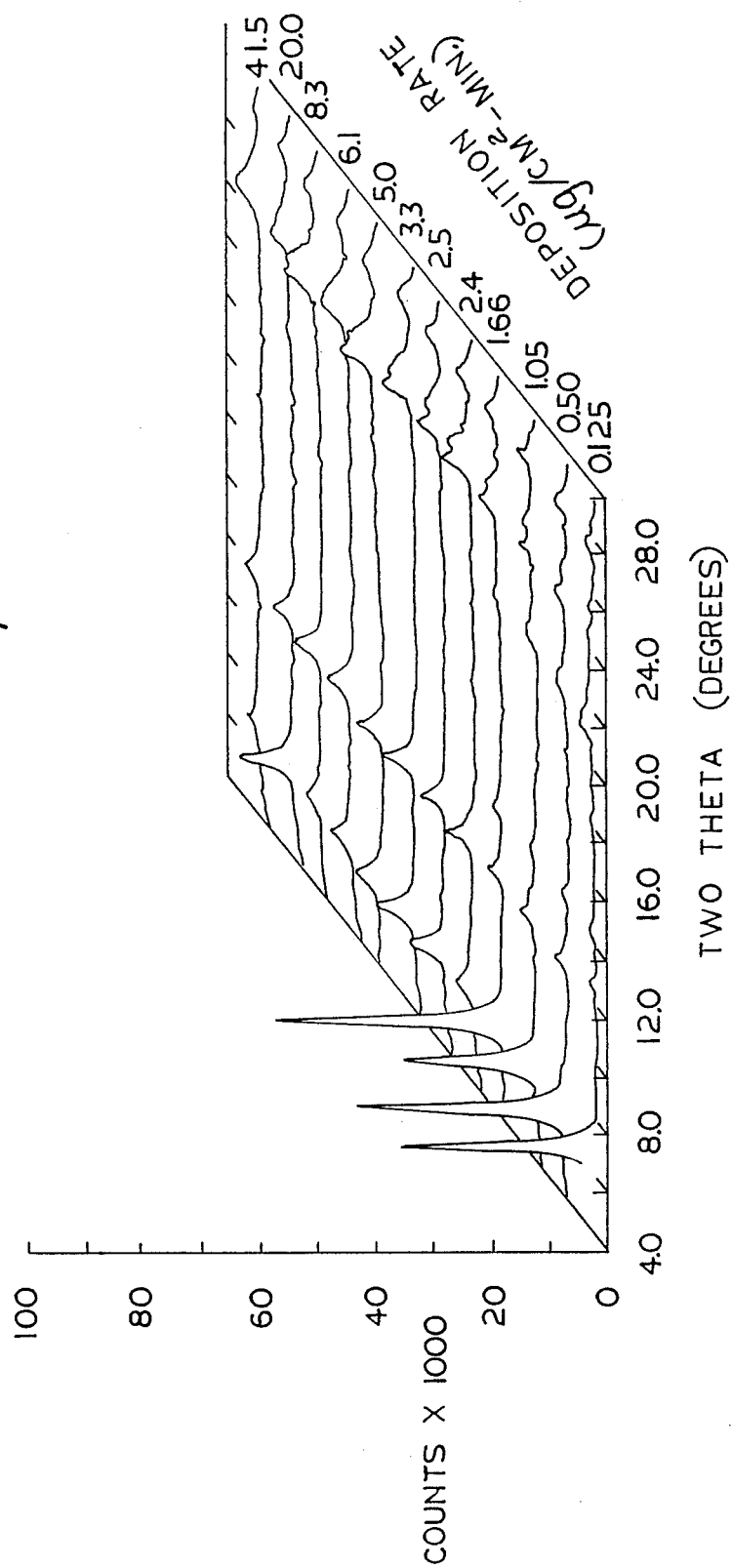
FIG. 6 shows a series of grazing incidence X-ray diffraction scans obtained from vapor deposited layers of VOPc, FIG. 6A as a function of deposition rate, and FIG. 6B as a function of thickness.

Another example illustrating how control of the physical microstructure can be used to obtain anisotropic optical properties in the layer is given in FIG. 6, which shows a series of low angle X-ray diffraction curves from a series of VOPc layers vapor deposited at the ambient substrate temperature, but varying deposition rates. In FIG. 6A all layers had the same mass density of 41.5 $\mu g/cm^2$. For deposition rates below about 2.4 $\mu g/cm^2$-min., preferably 0.00025 to 2.4 $\mu g/cm^2$-min, more preferably 0.01 to 2.4 $\mu g/cm^2$-min, the single intense peak in the X-ray two-theta diffraction curves clearly show the layer's grains are both highly crystalline and anisotropically oriented. The single peak can be identified from the two-theta scattering angle as the (010) reflection of a crystalline phase of VOPc, as discussed by Walker et al., *Mol. Cryst. Liq. Cryst.* 1976, Vol 33, pp. 149-170. The fact that only that diffraction order is seen in the low deposition rate layers of FIG. 6 implies that substantially all the crystalline material is preferentially oriented with the (010) lattice planes parallel to the substrate. (For a discussion of grazing incidence X-ray diffraction, see M.K. Debe, *Progress in Surface Science* 24(1-4)(1987) 83). At higher deposition rates the peak is strongly attenuated and the layers could be described as relatively amorphous and disordered.

FIG. 6B shows that the high degree of crystallinity and orientational order obtained at low deposition rates is maintained as the layer thickness decreases. Scanning electron micrographs also show that the crystalline layer grains, obtained at the low deposition rates, are less well defined, more acicular in shape and tend to be oriented more parallel to the layer plane than the non-crystalline grains obtained at high deposition rates. The visible-near IR absorption spectrum is significantly different for the low and high deposition rate layers, and in particular the anisotropic oriented crystalline layer has a peak absorption around 820 nm, the optimum for GaAs solid state laser operation. The optical properties of this anisotropic crystalline layer form of vapor deposited VOPc are thus distinctly different from the previously taught amorphous form.

As discussed in Example 5, optical discs coated with the anisotropic crystalline form of the VOPc exhibited substrate incident reflectivities that were 20 to 50% lower than the high deposition rate, isotropic layers of the same thickness. Removal of the anisotropy by exposure to the laser beam produced a larger increase in reflectivity and a correspondingly larger increase in electronic signal from the anisotropic layers than could be obtained from layers which were initially more isotropic. In the practice of the present invention useful deposition rates are in the range of 0.00025 to 50 $\mu g/cm^2$-min., preferably less than 2.5 $\mu g/cm^2$-min. The most preferred range will vary, depending on the organic material used.

Various configurations of the disc assembly of the recording media of the present invention are possible. Two illustrative configurations are shown in FIGS. 10A and 10B. In FIG. 10A, two recording media 28 and 29 comprising transparent substrates 20 and 30 and each with one or more layers of organic material 21 and 24 respectively, are assembled such that the organic layer surfaces 23 and 24 are facing each other and separated by a spacer material 22 such that there is an air gap 25 between the two organic layer surfaces 23 and 24. The complete assembly is held together by a support element 26.

In FIG. 10B two recording media 38 and 39 each comprising a transparent substrate 50 and 40, each with one or more layers of organic materials 31 and 37 respectively, are assembled such that the two organic layer surfaces 33 and 34 are facing each other and separated by a small gap 35, of about two wavelengths of the recording radiation. In this configuration the disc assembly is held in place by support elements 36 and 32.

The optical recording medium of the present invention will be useful for a variety of applications which are well known to those skilled in the optical recording art. Particular applications include, but are not limited to, storage and retrieval of data in digital form by the end user. Currently available CD-ROM's (Compact Disc-Read Only Memory) are replicates prepared from a master disc and as such are not end-user recordable. In contrast to currently available CD-ROMs, the instant invention provides for an economically manufactured end-user recordable optical medium.

In summary, with respect to VOPc, three forms of controlled physical microstructure have been demonstrated which provide a layer suitable for optical recording. The three forms exhibit the following properties: (a) inhomogeneous density profile, (b) oriented molecules, and (c) oriented crystalline grains. The latter two properties, molecular orientation and crystallinity provide the VOPc layer with a uniaxially anisotropic refractive index profile such that the real and imaginary components of the complex refractive index defined along the direction perpendicular to the plane of the layer at some wavelength are at least 10% different from the real and imaginary refractive index components defined along a direction in the plane of the layer.

EXAMPLES

There are four kinds of examples set forth below. First set of examples clearly establish the use of the thin layer microstructure anisotropy and/or inhomogeneity of vapor deposited layers of VOPc and lead phthalocyanine (PbPc) to record and read optical information upon exposure to electromagnetic radiation at 810-830 nm. Second set of examples establish that an initial physical microstructure inhomogeneity can be controlled through the deposition parameters to enhance the optical recording, again using VOPc and thereby also demonstrating for the first time an oriented, crystalline thin layer not recognized by any prior art. Third, examples are given to demonstrate the use of compounds other than phthalocyanines and at read/write wavelengths other than 830 nm, for example at 488 and 514 nm, to establish that this invention is not specific to any particular organic molecule or absorption wavelength, but is more generally based on the use of physical microstructure in the vapor deposited layers, that is, based on physical microstructure which is anisotropic and/or inhomogeneous along the direction perpendicular to the plane of the organic layer. Fourth, an example is given using vanadyl etioporphyrin I to demonstrate that changes in the optical inhomogeneity of the layer can occur upon laser exposure at one wavelength, without any change in surface topography being evident, which causes the substrate incident reflectivity to significantly increase at several other wavelengths. Within the scope of this invention, one can optically write at one wavelength and optically read at another wavelength.

The first set of examples utilize actual dynamic testing to demonstrate the invention. Typical laser disc recording systems utilize Ga-As solid state lasers operating at 830 nm, for which vanadyl phthalocyanine (VOPc) has a strong absorption constant. VOPc also has a reasonably large real component of refractive index which is important for enhancing the reflectivity change used in this invention. It should be recognized, however, that this invention is not specific to VOPc or 830 nm, nor to the need to write and read at the same wavelengths.

For all the following examples, both polycarbonate optical recording disc blanks and glass discs and slides have been used as substrates.

Various modifications and alterations of this invention will become apparent to those skilled in the art without departing from the scope and spirit of this invention, and it should be understood that this invention is not to be unduly limited to the following illustrative embodiments set forth herein.

EXAMPLE 1

VOPc powder, as received from the manufacturer, was vacuum sublimation purified by heating it in a long evacuated tube furnace for over 20 hours at 496° C at pressures below 0.01 mTorr at the pumping orifice of the tube furnace. The purified material was then heated in a commercial aluminum oxide crucible within a diffusion pumped vacuum bell jar system. A 13.33 cm diameter polycarbonate optical recording disc was mounted approximately 20 cm above the crucible, with the recording tracks of the recording disc facing down towards the crucible. No cleaning, priming or other special procedures were used to prepare the optical disc blank. The bell jar was evacuated to the low $10^{-6}$ Torr range and the VOPc outgassed by heating the crucible at less than the sublimation point of the VOPc for a period of 75 minutes during which time the crucible heating current was increased in steps from 5 amps to 9.5 amps. Also during this time the disc was shielded from the crucible by a movable shutter.

The disc was rotated by means of a vacuum rotary motion feedthrough at about 1 revolution per second in order to obtain spatial uniformity in the layer thickness at constant radial position on the disc. The first disc (substrate) was not preferentially warmed or cooled but remained at an ambient temperature estimated to be about 30° C during the deposition process. To deposit the VOPc layer, the crucible heating current was increased as described above to 9.5 amps until sublimation was evident by a quartz crystal deposition monitor used to determine the deposition rate and total relative thickness. When the sublimation rate had stabilized the shutter was rotated aside to allow the subliming VOPc to deposit onto the rotating disc substrate. The quartz crystal deposition monitor was used to follow the deposition which proceeded at a rate of about 3.3 $\mu g/cm^2$-min. to a total thickness of 10 $\mu g/cm^2$, at which time the deposition was stopped by shutting off the heating current to the crucible and closing the shutter. The disc was removed from the deposition chamber, visually inspected and reinstalled for a second deposition similar to the first. This was carried out at a rate of 3.0 $\mu g/cm^2$-min. to yield a total thickness of about 16 $\mu g/cm^2$. No further processing of any kind was performed on the disc prior to its dynamic testing on a laser optical disc test station and its characterization by scanning electron microscopy. At these deposition rates and thicknesses, neither the layer crystallinity nor thickness was optimized, as described in later examples.

The dynamic read/write testing was done with a focused 830 nm laser diode. The beam was first collimated with a 0.6 numerical aperture lens, shaped with a right angle prism, and circularly polarized with a quarter wave plate. The focusing of the laser diode beam was done using a separate helium-neon laser. The He-Ne laser uses off-axis tracking in a servo-mechanism scheme to keep the distance between the read/write head lens (Taohs) and the disc constant. The laser diode's interference pattern was caused by the land and grooved regions (tracks) of the disc. This interference pattern was used with a servomechanism to keep the laser diode beam focused over a certain groove or land. The laser diode was pulsed to a high power level for writing (greater than 3 mW), and after the writing pulses had been applied, the laser diode used a lower power (1.2 mW) to read the written areas. The change in reflectivity before and after writing was detected by a photodetector and sent to a spectrum analyzer for analysis.

Because the layer had an inhomogeneous density along the direction perpendicular to the plane of the layer, quoting a linear layer thickness based on the deposited mass measured by the quartz crystal deposition monitor during deposition is not accurate. For that reason, the layer "thickness" has been expressed in units of mass per unit area, as measured during the deposition process.

FIG. 3 shows an SEM cross-sectional view through a laser written spot on the disc described in Example 1. A high power level of 14 mW was used in this case and FIG. 3 illustrates the limit of the changes induced in the physical microstructure of the layer. It was clear that the material in the imaged area was not ablated, but rather, the organic layer was transformed into a glassy-like homogeneous and isotropic material. TABLE I shows the dynamic C/N (carrier-to-noise) ratio versus write power, measured at 1800 rpm, 2.5 MHz and with both writing and reading done in a substrate incident mode.

TABLE 1

| Dynamic C/N (carrier-to-noise) ratio versus power for an inhomogeneous VOPc layer vapor deposited on a polycarbonate substrate to a thickness of 16 $\mu g/cm^2$ | |
|---|---|
| Power (mW) | C/N (dB) |
| 2 | 1.0 |
| 3 | 1.4 |
| 4 | 27.9 |
| 5 | 34.8 |
| 6 | 43.3 |
| 7 | 44.1 |
| 8 | 43.6 |
| 9 | 44.0 |
| 10 | 43.0 |
| 11 | 42.9 |
| 12 | 38.0 |
| 13 | 31.4 |
| 14 | 23.8 |

As shown in the table, the layer exhibited a sharp write threshold at 3 mW. At 6 mW, well below the 14 mW level, the C/N ratio had peaked at 43 dB. The C/N ratio was substantiallY less at 14 mW, and flat from 6 to 11 mW. The data show the optimum performance occurred even before the layer was changed to the extent of FIG. 3. The reflectivity increase observed at 10 mW for this disc sample was about 9.5% before to 13.5% after, giving a 43 dB signal.

EXAMPLE 2

Using this concept of microstructure-derived, gradient refractive index profile change-mechanism to record laser optical information on a single layer, a variety of mass thicknesses in the range of 6.6 to 17 μg/cm² were tried, using deposition rates and ambient substrate temperatures similar to those of example 1. Better performance was achieved with layer mass thicknesses near 10 μg/cm². As a second example, a disc was coated with VOPc to 10 μg/cm² with conditions similar to those described in Example 1.

Figure 4A:
FIG. 4A is an SEM (50,000×magnification) of the cleaved edge of a coated disc taken at a 45 degree viewing angle before laser writing.
Figure 4B:
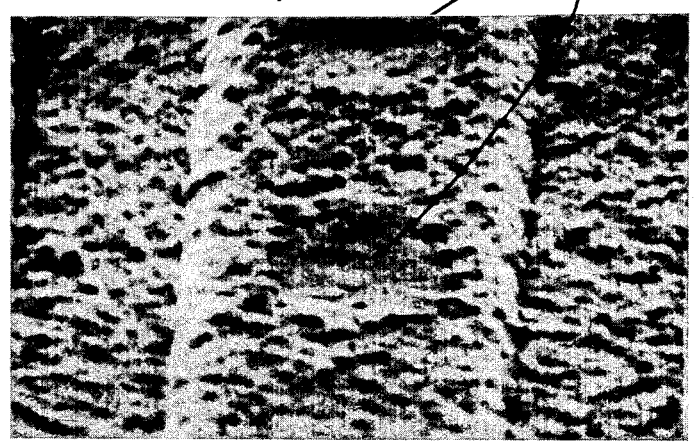
FIG. 4B shows the same layer surface after writing with a 6 mW input laser power.

FIG. 4A shows a freeze-fracture prepared SEM micrograph of the VOPc layer 11 on a polycarbonate (PC) recording disc, deposited in a single vacuum sublimation run to an overall thickness of 10 μg/cm². Though only two-thirds as "thick" as the first example, the layer surface morphology was very apparent. The layer was seen to evenly coat the tracking grooves of the PC substrate. FIG. 4B shows an SEM image of the written spot 13 on this layer sample when a write power of 6 mW is used. Only a slight indication of disturbance to the layer is apparent by looking at the change in surface morphology. The layer in the area of the written spot definitely appeared smoother. As Table 2 shows, again the peak C/N ratio of, in this case 48 dB, resulting from a reflectivity increase from 18.8 to 29.8%, has been realized at the 6 mW power level. More subtle changes in physical microstructure anisotropy and inhomogeneity at the unit cell and molecular orientation level may have occurred as well to alter the gradient index profile. A cross-sectional micrograph through the write spot again showed no significant change in thickness, proving ablation was not the source of the signal. At increasing power levels the write areas again became more apparent, eventually appearing as shown in FIG. 3. The physical microstructure change associated with this occurring at the highest power levels has been described in FIG. 2.

It is important for the understanding of this invention to realize that physical microstructure refers to more than just the surface topography or density inhomogeneity of a layer, and that an anisotropic index profile can result from other than this source of inhomogeneity.

TABLE 2

Dynamic C/N ratio versus write power for an inhomogeneous layer of VOPc vapor deposited on a polycarbonate substrate to a thickness of 10 μg/cm²

| Power (mW) | C/N (dB) |
| --- | --- |
| 2 | 0.7 |
| 3 | 20.6 |
| 4 | 17.5 |
| 5 | 40.6 |
| 6 | 47.8 |
| 7 | 47.5 |
| 8 | 48.7 |
| 9 | 48.9 |
| 10 | 49.9 |
| 11 | 50.5 |
| 12 | 50.2 |
| 13 | 48.7 |
| 14 | 48.6 |

This change in the physical microstructure anisotropy and/or inhomogeneity occurred at the crystalline polymorph and molecular orientation level, as described in the detailed description section of this specification.

The next two examples illustrate this by showing first, how the molecular orientation can be enhanced by cooling the substrate during deposition and second, how the grain crystallinity and orientation can be enhanced by proper choice of deposition rate.

EXAMPLE 3

To show that the average orientation of the molecules can be preferentially oriented, FIGS. 5A and 5B compare the external reflection-absorption infrared spectra from sample layers of VOPc deposited at similar rates and mass densities as in example 2, onto cooled and uncooled substrates, respectively. The substrates were copper coated glass slides which were thermally attached to cooled and uncooled polycarbonate optical disc blanks for coating with VOPc. The temperature during deposition of the cooled disc blank was nominally −5° C. The temperature during deposition of the uncooled disc blank was nominally 25° C.

The dynamic testing of the associated optical discs showed the initial reflectivity was lower for two different cooled samples than for the uncooled samples, decreasing to an average of 15.5%. The reflectivity changed upon writing to an average of 30.5% for a maximum C/N ratio of 54.5 dB for each cooled disc, compared to an average of less than 52 dB for five uncooled discs coated at room temperature to approximately the same thickness. The data show anisotropically deposited, cooled layers, present a clear advantage over the more isotropic, uncooled layers.

EXAMPLE 4

As another example illustrating how control of the physical microstructure inhomogeneity and anisotropy can be used to enhance the optical recording process, we demonstrate how control of the deposition rate can be used to obtain a heretofore unknown highly crystalline and oriented phase of a vapor deposited VOPc layer, and the subsequent enhancement in C/N ratio.

FIG. 6A shows grazing incidence X-ray diffraction spectra for a series of VOPc layers vapor deposited at ambient substrate temperature, but varying deposition rate. All the layers had the same mass density of 41.5 μg/cm². The implied crystallinity and uniaxial anisotropy were discussed in the detailed description section of this invention. FIG. 6B shows that the high degree of crystallinity and orientational order obtained at low deposition rates was maintained as the layer thickness decreased.

Two polycarbonate optical discs were vapor coated with VOPc at rates of 0.5 and 8.3 μg/cm²-min to mass thicknesses of 24.9 μg/cm². The oriented crystalline layer exhibited a slightly lower initial reflectivity, 15% versus 17%, and an overall reflectivity change upon writing of 6% versus 5.5%, at both 900 and 1800 rpm and 2.5 MHz writing speed. At 1800 rpm and 8 mW write power the C/N ratio observed from the low deposition rate layer was 49.6 dB versus 44.8 dB from the high rate layer. The low rate layer also gave an improved power scan, having a sharper threshold saturation over a broader power range and minimization of the second harmonic at the optimum write power.

In another set of samples, four polycarbonate optical discs were vapor coated with VOPc as above, two at the high deposition rate of 8.3 μg/cm²-min., and two at the low deposition rate of 0.5 μg/cm²-min. For each rate, two layer thicknesses were coated, one at 16.6, the other at 20 μg/cm². Again dynamic read and write measurements were made at 900 and 1800 rpm and 2.5 MHz. In each case the more crystalline, low deposition rate discs had a lower initial reflectivity and a larger overall reflectivity increase upon writing. This in turn resulted in a larger C/N ratio in each case. For the 16.6

μg/cm² layer, at 900 rpm the reflectivity change was from 20 to 24% for the high rate layer but 11 to 20% for the low rate layer, with a corresponding improvement in written C/N from 44 to 54 dB. For the 20 μg/cm² layer, at 1800 rpm, the reflectivity change was from 13 to 16% for the high rate layer and 10 to 19% for the low rate layer, with a corresponding improvement in written C/N from 42 to 46 dB. For the same layer thickness, but at 900 rpm, the reflectivity change for the high rate layer was from 15 to 21% and 12 to 20% for the low rate layer, with a corresponding improvement in written C/N from 42 to 46 dB.

The data show that the refractive index profile of a vapor deposited layer has contributions at several levels of physical microstructure definition: the molecular orientation level, the microscopic crystalline polymorph level, the oriented microcrystalline grain level, and the larger scale surface topography level. As the power of the laser beam increased, changes in each of the microstructure forms could be induced, resulting in a change in the initial low reflecting gradient index profile towards a more reflective step function refractive index profile, or a change in an initially anisotropic index profile to an isotropic refractive index profile. Clearly, as the laser power was increased further, actual ablation, evaporation and sublimation of the material occurred as the ultimate level of change. This is the state of material change relied on by the prior art and is to be distinguished from the gradient index mechanisms of this invention.

EXAMPLE 5

Lead phthalocyanine (PbPc) was vacuum purified in the same manner as the VOPc described in Example 1, and vapor deposited onto a polycarbonate disc to mass thicknesses of 16.6, 27.0 and 41.5 μg/cm², at a rate of 5.7 μg/cm²-min. For the 41.5 μg/cm² thickness, the substrate incident reflectivity at 830 nm increased from 8% to 10% at 8 mW write power. For the 27 μg/cm² thickness, the reflectivity rose from 5% to 9%, and for the 16.6 μg/cm² thickness from 2% to 7%. All measurements were at 900 rpm, 2.5 MHz and 8 mW write power. Since the reflectivity of the bare substrate was 4%, and the written reflectivity increases above this value for all three thicknesses, ablation leading to pit or hole formation to expose the substrate could not be occurring. We conclude that as with the VOPc, the initial microstructure derived gradient refractive index profile was being converted to a more reflective step function index profile. In U.S. Pat. No. 4,241,355, PbPc was reported to have a real refractive index at 800 nm of 2.4, similar to that of VOPc.

EXAMPLE 6

To further demonstrate that the present invention is not specific to a chemical property or wavelength, a static test facility, operating at 488 nm and 514 nm with approximately a 1.6 micrometer focused beam diameter and variable pulse length and rate, was applied to layers of vapor deposited etioporphyrin I, having the structure shown below.

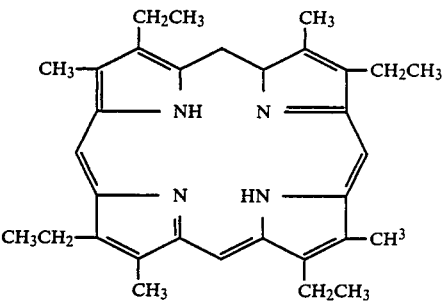

The material was vacuum outgassed in the crucible of the bell jar system used for vapor depositing the material by heating.

A series of layer thicknesses varying between 5 and 25 μg/cm² were deposited at rates varying between 0.83 and 1.6 μg/cm²-min. onto glass substrates at ambient temperature. The 514 nm laser writing pulse power, pulse length and the total number of pulses were varied for each sample and the spot reflectivities before and after, writing measured with the test facility. The medium's response was a sensitive function of layer thickness, pulse power and pulse duration and could be made to ablate as evidenced by the initial reflectivity, when over 4%, decreasing to approach that of the substrate. This material had neither the thermal stability nor the high refractive index of VOPc or PbPc, yet several conditions could be found which cause the substrate-incident reflectivity to increase significantly beyond that of the substrate. For a 20 μg/cm² thick layer, a 10 mW 150 nsec pulse induced a 5 to 5.8% reflectivity change repeatably. A 25 μg/cm² thick layer gave a 4% to 5% change with a 10 mW, 150 nsec pulse (a 25% increase in signal level). For a 16.6 μg/cm² thick layer, a 10 mW, 150 nsec pulse produced a 3.2% to 4.6% increase. Multiple pulses on the same spot caused the reflectivity to increase to 8%. For a 23 μg/cm² thick layer, a 4.4 to 4.7% increase resulted at 10 mW and 150 nsec. Longer pulses caused the reflectivity to decrease, implying ablation was occurring. A 25 μg/cm² thick layer, written at 10 mW and 150 nsec, exhibited a 4.7% to 5.4% increase. Finally, a layer of nonuniform thickness, deposited onto a polycarbonate disc, exhibited a 4.2% to 8.6% increase for a 10 mW and 270 nsec pulse at one point, and a 5.6% to 6.7% increase at another point.

Such variability in a medium's absolute response depending on the layer's thickness and microstructure resulted when a nonablative writing mechanism was being used. This can be understood in terms of changes in the gradient index profiles, shown in FIG. 2 depending on details of the layer's microstructure density inhomogeneity and overall thickness and the optical energy input versus time profile.

EXAMPLE 7

As a further example of the generality of this invention, the dyestuff compound shown below, INDANTHRENE GOLDEN YELLOW G K. (generic name C.I. VATYELLOW 4 (C.I. 59100)), obtained from General Dyestuff Co. (no longer in business),

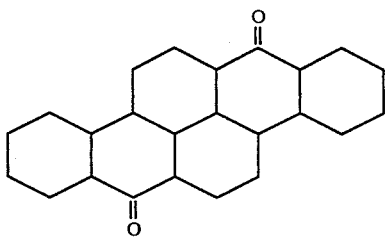

was vacuum purified by sublimation overnight at 285° C while evacuating the glass sublimation tube to the low miliTorr pressure range. The condensate material was removed from the walls of the sublimation tube and placed in a crucible in the bell jar vacuum system described in Example 1. As in Example 6, a series of layer thicknesses, varying from 13.3 to 19.9 μg/cm² were vapor deposited onto glass slides at ambient temperature and rates of approximately 2.0 μg/cm²-min. Static testing with the facility described in Example 6 was carried out at 488 nm. Again the absolute reflectivities before and after writing were found to be very dependent on the layer parameters and the write pulse characteristics. In this case a reflectivity increase from 4.3 to 4.5% occurred in a layer of 13.3 μg/cm² thickness after a repetitive series of 9 million, 14 mW 150 nsec pulses.

EXAMPLE 8

A further example utilized the compound AMANTHRENE RED FBB (generic name C.I. VATRED 10 (C.I. 6700)), shown below, a vatdye obtained from

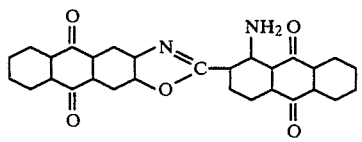

American Aniline Products Inc. (no longer in business). This material was vacuum sublimation purified by heating it to 325° C overnight while evacuating the sublimation tube to the low miliTorr range. The sublimated condensate was removed from the tube wall for vapor deposition in the vacuum bell jar system described in example 1.

As for previous examples, a series of layer thicknesses were vapor deposited onto glass substrates at ambient temperature and a deposition rate of approximately 1 μg/cm²-min. The initial substrate incident reflectivity measured with the static test facility of example 6 was again a strong function of layer thickness. For a thickness of 13 μg/cm², the reflectivity increased from 4.0% to 4.4% after 6 million, 9 mW pulses of 150 nsec duration.

EXAMPLE 9

This example further demonstrates that the present invention is not specific to a particular wavelength or chemical property. This example further illustrates how a significant reflectivity increase can be realized by reading at a wavelength different from the writing wavelength. This example also demonstrates that a large relative reflectivity increase can be obtained by changes in the layer homogeneity at the molecular polymorph unit cell level, without any changes in surface topology or layer roughness being apparent in SEM micrographs.

Vanadyl etioporphyrin I, VOC$_{32}$H$_{36}$N$_4$ or VOetio, shown below,

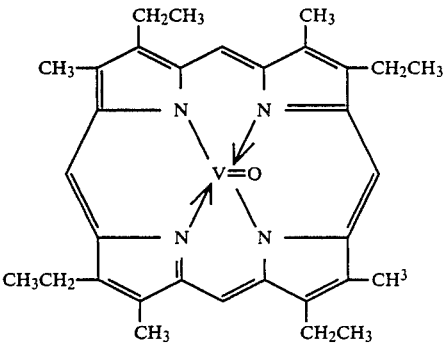

was prepared by vanadation of etioporphyrin I. Etioporphyrin I was synthesized by the method described by Rislove et. al., *Journal of Chem. and Engineering Data*, p.588, 13(4) (1968). The vanadation of etiopophyrin I was then carried out using the following procedure developed by David Rislove of the Chemistry Department of Winona State University.

Procedure for Vanadation of Octa-Alkylporphyrins Vanadyl Etioporphyrin I

Etioporphyrin I (C$_{32}$H$_{38}$N$_4$, 255 mg, 0.532 mmol, D.J. Rislove), vanadyl sulfate trihydrate (VOSO$_4$·3-H$_2$O, 1.64 g, 7.5 mmol, Aldrich, 99.99%), anhydrous sodium acetate (NaC$_2$H$_3$O$_2$, 1.30 g, 16 mmol, Baker, 99.9%) were placed in a 100 mL 14/20 round-bottomed (rb) flask with 0.5 g Carborundum boiling chips and glacial acetic acid (HC$_2$H$_3$O$_2$, 35 mL, Baker, 99.8%) was added to the mixture. A reflux condenser was added to the flask and the mixture gently refluxed for 13 hours using an electric heating mantle. Aliquot samples taken earlier in the reflux period showed the presence of some unreacted etioporphyrin I when examined by visible spectroscopy. Vanadation was nearly complete after 13 hours reflux. Visible absorption bands attributable to etioporphyrin I were still present in the crude product but the spectrum indicated a low concentration of the metal-free porphyrin. The hot mixture was poured onto 250 mL ice water, the mixture extracted several times with methylene chloride, the combined extracts filtered to remove insoluble solids, and the extract roto-evaporated several times to near dryness with small quantities methylene chloride and chloroform successively added to azeotropically remove some water and acetic acid. The residue was dissolved in approximately 200 mL benzene (500 mL rb flask) with the aid of a little chloroform, and the solution allowed to stand in the dark for 72 hours at room temperature while allowing the solvent to slowly evaporate during this time to allow crystallization. The first crop of red crystals were collected by vacuum filtration, washed several times with cold methanol, allowed to air dry overnight and finally vacuum dried in a desiccator at 0.20 mmHg and 50 deg C for two hours to remove the last traces of water and acetic acid. A visible spectrum of a sample of the crystalline solid still showed the presence of a small amount of unreacted etioporphyrin I due to weak absorption bands at 620 and 500 nm. Strong absorption bands at 571, 533 and 407 (Soret) nm with molar extinction coefficients of approximately 3.5, 1.5 and $39 \times 10^4$ L/mol·cm, respectively, were characteristic of vanadyl etioporphyrin I. The unreacted etioporphyrin I was removed by column chromatography. The yield of once-crystallized VOetio I was 213 mg (73.7%).

The VOetio I was recrystallized once from benzene-chloroform and then vacuum dried at 50° C for two hours. Approximately 50 to 70 miligrams were placed in the vacuum system crucible described in example 1 and outgassed for a period of one hour while increasing the crucible heater current from 5 to 7 amperes. Seven layer samples with mass thicknesses ranging from 19 to 24 $\mu g/cm^2$, deposited at rates between 1.5 to 1.9 $\mu g/cm^2$-min. were prepared on either bare glass substrates or glass sputter coated first with aluminum or copper. All these samples were then written on using a He-Cd laser operating at a wavelength of 441.6 nm with an unfocused beam diameter of 1.2 mm and power of 44 mW. Visible absorption spectra from these layers show an intense absorption band centered at 407 nm. Hence, wavelengths in the range from 360 nm to 442 nm could be used just as or even more effectively to image this layer than the 442 nm of this example. The laser was used in both an unfocused mode and with a 20×objective to focus the beam onto the layer at varying layer-objective distances.

For a sample deposited on bare glass to a mass thickness of 26 $\mu g/cm^2$ at a rate of 1.7 $\mu g/cm^2$ -min. the exposure times were systematically varied from 5 minutes to 1 second and the resulting imaged spot observed with an eyeloupe. The imaged spot was apparent to the eye for exposure times down to 1 minute with the unfocused beam and down to one second for the most focused objective position used. The beam diameter under this most focused condition was 35–40 micrometers. These observations were fully consistent with several earlier samples on both glass and copper coated glass substrates in which the exposure times were less controlled.

Another sample layer prepared on aluminized glass at a deposition rate of 1.9 $\mu g/cm^2$-min to a thickness of 24 $\mu g/cm^2$ was also similarly exposed with focused and unfocused beams. In static, single spot imaging, exposure times of 3 or 5 minutes were used. The focused beam was also translated between spots at a rate of approximately 1 mm/second or one beam diameter per 0.04 seconds, in which case the exposed area was a linear track having approximately a 40 micrometer beam diameter. Observation of the exposed areas with reflection phase contrast microscopy showed a clear image of the written area. In the linear track imaged areas, receiving the least exposure, the layer had a "mud-cracking" appearance and a color distinctly different from the unexposed VOetio I. In the static imaged spots receiving the much longer exposure, the imaged area under phase contrast microscopy was different in color from both the linear track area and the unexposed area. The static spots also appeared about 3×larger in diameter than the linear track and appeared to consist of concentric circular regions of different colors, which lacked the "mud-cracking" fissures seen in the low exposure linear track areas.

The final sample prepared was characterized by transmission phase contrast microscoscopy, ordinary microscopy, scanning electron microscopy and visible spectroscopy. VOetio was deposited onto bare glass at a rate of 1.9 $\mu g/cm^2$-min. to a thickness of 24 $\mu g/cm^2$.

SEM micrographs of a fractured edge of the deposited layer show a very smooth layer surface but some texture apparent within the layer thickness at 30,000 magnification. A nominal layer linear thickness obtainable from the SEM edge fractures is approximately 0.6 micrometers. The layer was exposed in the same manner described for the previous sample. By phase contrast microscopy, the same mud-cracking and color change appearance was observed in the minimal exposure linear track area for this sample as for the previous sample. The larger static imaged spots had a central darker colored region about 60 micrometers in diameter, surrounded by a lighter colored region about 90 micrometers in diameter which was surrounded by a region about 120–150 micrometers in diameter which was the same color as the unexposed areas as the VOetio I, but was defined by the presence of weak interference fringes. These fringes cover all three regions and have a "sanddune-covered-desert" appearance. The fringes are a clear indication of nonuniformity of the refractive index within the layer's bulk.

Figure 7:
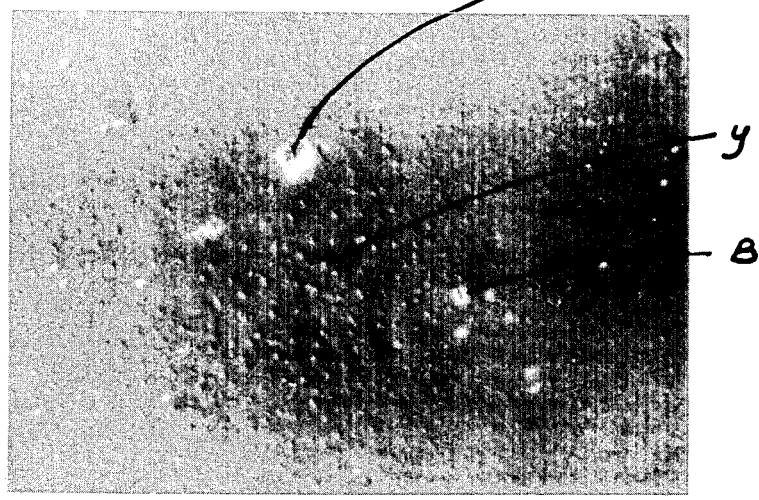
FIG. 7 shows a 200×optical microscope image of a spot of vanadyl etioporphyrine I (VOetio I) after exposure for 3 minutes with the beam focused to a spot of about 100 micrometers in diameter.
Figure 8:
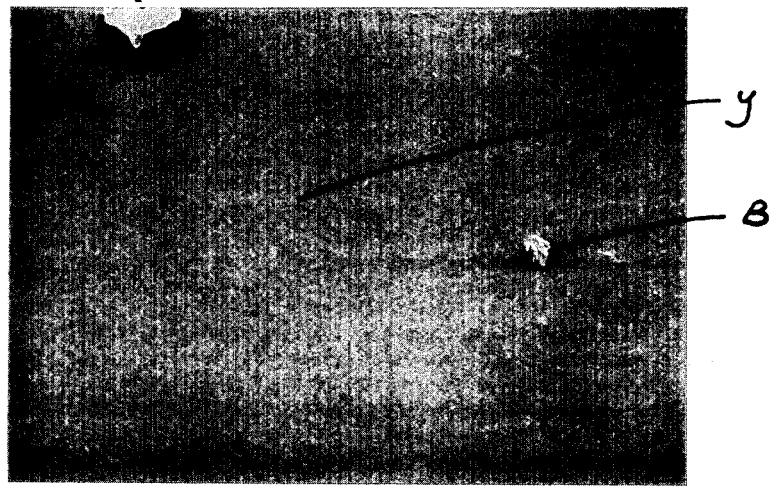
FIG. 8 shows a 1000×scanning electron microscope of the same VOetio I area shown in FIG. 7.

FIG. 7 shows a 200×optical microscope image of a spot (y), bounded by two dust particles (A) & (B), after exposure for 3 minutes with the beam focused to about 100 micrometers. This ordinary optical microscopy image of the long duration exposed spot appears to show a slight roughening of the layer, giving the impression of a distribution of many tiny bumps and pits within the written spot. However, this is also an optical artifact deriving from a change in the refractive index profile inhomogeneity within the written area, since scanning electron microscopy clearly shows that the surface of the VOetio I remains highly smooth even at a magnification of 30,000×. FIG. 8 is a scanning electron microscope image of the same spot (y), at 1000× magnification. The scanning electron microscopy clearly shows that the surface of the VOetio I remained highly smooth. The optical transmission microscope image, FIG. 7, revealed the optical properties throughout the entire layer thickness, whereas the scanning electron microscope, FIG. 8, was a consequence of the secondary electron emission from only the surface region of the layer. The laser exposed region was thus shown to be topologically very smooth and unchanged in surface texture by the laser exposure but its refractive index distribution within the layer had changed.

Figure 9A:
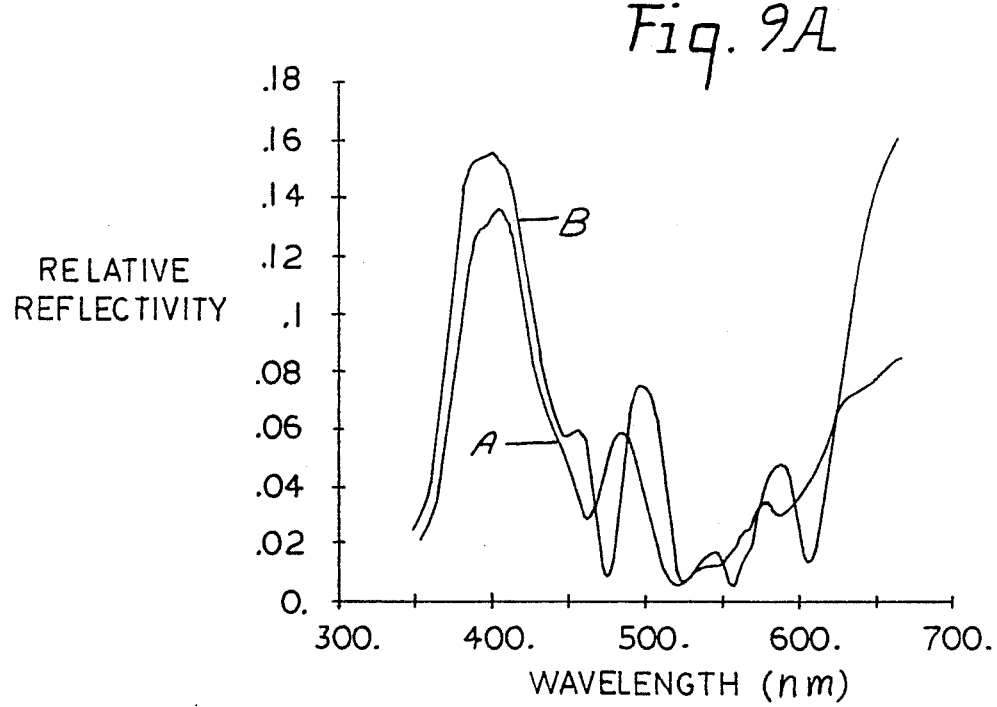
FIG. 9A compares the reflectivity of the written spot shown in FIGS. 7 and 8 (tracing B), with that of the unwritten layer (tracing A).
Figure 9B:
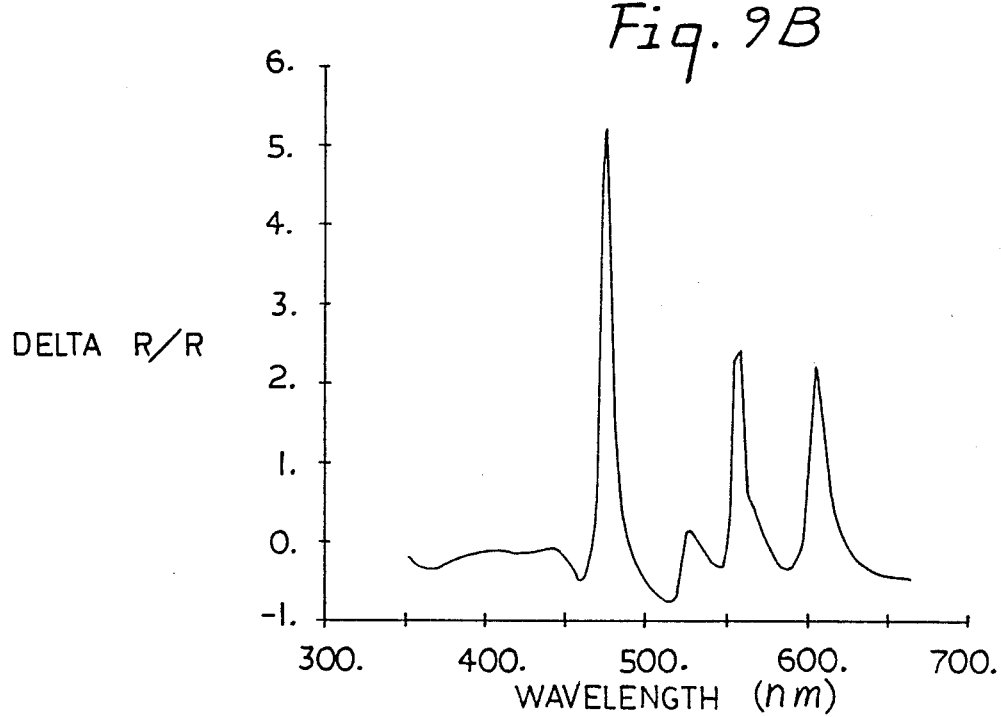
FIG. 9B shows the relative change in reflectivity from the written spot (tracing B in FIG. 9A) compared with that of unwritten layer (tracing A in FIG. 9A).

The reflectivity of a written spot adjacent and identical to the one just described was then measured in a substrate incident mode, i.e. through the glass substrate, as a function of wavelength from 350 nm to 650 nm. FIG. 9A compares the reflectivity of the written spot with the unwritten spot while FIG. 9B shows the relative reflectivity change (delta R/R) of the written spot compared to the unwritten layer area. This latter quantity is defined as $(R_{written} - R_{unwritten})R_{unwritten}$. Hence the written spots appear bright, or more reflective, at the peak wavelengths of about 475, 560 and 610 nm. At 475 nm, e.g. the reflectivity had increased from about 1% to 6%. The VOetio I is therefor a useful optical information and storage medium for writing at wavelengths near 400 nm and reading at wavelengths close to 475, 560 or 610 nm. In FIG. 9 the reflectivity peak at 500 nm was important for this invention. Transmission absorption spectra of VOetio I showed an extremely strong absorption peak at 407 nm and two smaller absorption maxima at 540 nm and 575 nm. These absorptions are clearly responsible for the reflectance peaks at 545 nm and 580 nm in the spectrum of FIG. 9A obtained from the unwritten area. The reflection peak at 500 nm therefor corresponds to an absorption minimum of VO-etio I and derives from destructive and constructive interference effects within the layer which is nonabsorbing between 475 nm and 525 nm. The shift in peak position and amplitude of this interference peak which occurs upon laser writing, is a direct manifestation of a change in the gradient refractive index profile of the layer which occurs upon laser exposure.

Having fully described the preferred embodiments of the invention, it should be understood that numerous alternatives and equivalents which do not depart from the present invention will be apparent to those skilled in the art, given the teaching herein, and are intended to be included within the scope of the present invention.

What is claimed is:

1. A method of recording information in which a recording medium is exposed to electromagnetic radiation to receive information wherein said recording medium comprises a substrate having on at least one surface thereof at least one layer of organic material capable of absorbing electromagnetic radiation and comprising nonspherical molecules, said organic material prior to exposure to said radiation having a physical microstructure which is uniaxially anisotropic such that at least 10% of all the molecules of the organic material are uniformly preferentially oriented within 35 15 degrees of an arbitrary angle relative to the plane of the layer and providing to said layer a refractive index profile which is anisotropic with respect to the direction perpendicular to the plane of the layer before exposure to radiation, and upon exposure to electromagnetic radiation reducing the level of anisotropy to the exposed portions of the layer such that at least 5% fewer of the molecules remain preferentially oriented without formation of pits, holes, or bubbles or ablation of the exposed portions of the layer.

2. The method according to claim wherein said organic material is selected from the group consisting of vanadyl phthalocyanine, etioporphyrin I, INDANTHRENE GOLDEN YELLOW G.K. (generic name C.I. VATYELLOW 4 (C.I. 59100)), ANIANTHRENE RED FBB (generic name C.I. VATRED 10 (C.I. 6700)), vanadyl etioporphyrin I and lead phthalocyanine.

3. An optical recording medium for use with an optical recording and playback apparatus, by which the medium receives electromagnetic radiation to record information, said medium comprising a substrate, and containing on at least one surface of said substrate at least one layer of organic material capable of absorbing electromagnetic radiation and comprising nonspherical molecules and having a minimal thermal stability such that said organic material can be evaporated or sublimed under a pressure of 0.1 mTorr or less, without decomposition, by heating to at least 100° C, which material prior to exposure to said radiation has a physical microstructure which is uniaxially anisotropic, wherein the physical microstructure of said uniaxially anisotripic layer is inhomogeneous and provides to said layer a non-uniform density, said density constituting a continuously graded physical density gradient along the direction perpendicular to the plane of the layer before exposure to radiation, the extent of the density gradient is reduced to enable subsequent optical detection of said density of the organic layer varying over substantially the whole thickness of the layer, from a value at the substrate interface which is at least 10% above the entire layer average density, to a value at the air interface which is at least 10% below the entire layer density, said average layer density being any value not less than 10%, and not greater than 90% of the maximum bulk density of the organic material, whereby upon exposure to said radiation, the extent of the density gradient is reduced to enable subsequent optical detection of recorded information.

4. An optical recording medium for use with an optical recording and playback apparatus, by which the medium receives electromagnetic radiation to record information, said medium comprising a substrate, and containing on at least one surface of said substrate at least one layer of multi-grain crystalline organic material, wherein said organic material is selected from the group consisting of etioporphyrin I, INDANTHRENE GOLDEN YELLOW G.K. (generic name C.I. VATYELLOW 4 (C.I. 59100)), AMIANTHRENE RED FBB (generic name C.I. VATRED 10 (C.I. 6700)), vanadyl etioporphyrin I, and lead phthalocyanine, said material capable of absorbing electromagnetic radiation and having a minimum thermal stability such that said organic material can be evaporated or sublimed under a pressure of 0.1 mTorr or less without decomposition, by heating to at least 100° C, which material prior to exposure to said radiation has a physical microstructure which is uniaxially anisotropic such that at least 10% of all the molecules of the organic material are uniformly preferentially oriented within ±15 degrees of an arbitrary angle relative to the plane of the layer and providing to said layer a refractive index profile which is anisotropic with respect to the direction perpendicular to the plane of the layer before exposure to radiation, and exposing to electromagnetic radiation to reduce the level of anisotropy such that at least 5% fewer of the molecules remain preferentially oriented without formation of pits, holes, bubbles, or ablation of the exposed portions of the layer.

5. The optical recording medium according to claim 4 wherein said organic material is vanadyl etioporphyrin which can be written with radiation in the range of 360 to 460 nm, and read in the range of 460 to 640 nm.

6. The optical recording medium according to claim 4 wherein said medium comprises a single layer of dye or pigment deposited onto a substrate.

7. The optical recording medium according to claim 4 which can be written on and read by lasers operating at wavelengths in the range of 100 nm to 15 micrometers.

8. The optical recording medium according to claim 4 wherein the complex refractive index of said layer varies over substantially the whole layer thickness from a value at the substrate interface which is at least 10% above the entire layer average refractive index, to a value at the air interface which is at least 10% below the layer average refractive index, said average layer refractive index being any value less than or equal to the maximum bulk refractive index of the organic material.

9. An optical recording medium for use with an optical recording and playback apparatus, by which the medium receives electromagnetic radiation to record information, said medium comprising a substrate, and containing on at least one surface of said substrate at least one layer of multi-grain crystalline vanadyl phthalocyanine capable of absorbing electromagnetic radiation and having a minimal thermal stability such that said organic material can be evaporated or sublimed under a pressure of 0.1 mTorr or less and at a rate of at most 1.66 $\mu g/cm^2$-min, without decomposition, by heating to at least 100° C, which vanadyl phthalocyanine prior to exposure to said radiation has a physical microstructure which is uniaxially anisotropic such that at least 10% of all the molecules of the vanadyl phthalocyanine are uniformly preferentially oriented within 35 15 degrees of an arbitrary angle relative to the plane of the layer and providing to said layer a refractive index profile which is anisotropic with respect to the direction perpendicular to the plane of the layer before exposure to radiation, and exposing to electromagnetic radiation to reduce the level of anisotropy such that at least 5% fewer of the molecules remain preferentially oriented without formation of pits, holes, bubbles, or ablation of the exposed portions of the layer.

10. The optical recording medium according to claim 9 wherein the crystalline grains of said vanadyl phthalocyanine are substantially oriented in a common direction such that the (010) lattice planes are substantially parallel to the plane of the layer.

11. The optical recording medium according to claim 9 wherein the layer thickness is in the range of 1.5 $\mu g/cm^2$ to 300 $\mu g/cm^2$.

12. The optical recording medium according to claim 9 wherein said substrate is transparent.

13. The optical recording medium according to claim 9 wherein said vanadyl phthalocyanine, which has a uniaxially anisotropic microstructure, has a refractive index profile such that the real and imaginary components of the complex refractive index defined along the direction perpendicular to the plane of the layer at some wavelength, is at least 10% different from the real and imaginary refractive index components defined along a direction in the plane of the layer.

14. The optical recording medium according to claim 9 wherein said medium prior to exposure to electromagnetic radiation consists of a highly oriented layer of vanadyl phthalocyanine in which the molecular planes are substantially oriented within 35 15 degrees of a common angle between the plane of the molecule and the plane of the layer which has been coated by vapor deposition onto a substrate maintained at a temperature below 10° C.

15. An optical recording disc assembly comprising a first and second optical recording medium according to claim 9 wherein said first medium and said second medium comprise one or more layers of vanadyl phthalocyanine on a transparent substrate, and wherein said first layer of said first recording medium is so configured to face and be concentric with said second layer of said second recording medium, said first layer being separated from said second layer by a gap of at least two wavelengths of the recording radiation, and a means to maintain said configuration of said disc assembly.

16. The optical recording medium according to claim 9 wherein the physical microstructure of said uniaxially anisotropic layer is inhomogeneous and provides to said layer a non-uniform density, said density constituting a continuously graded physical density gradient along the direction perpendicular to the plane of the layer before exposure to radiation whereby upon such exposure, the extent of the density gradient is reduced to enable subsequent optical detection of recorded information.

17. The optical recording medium according to claim 16 wherein the density of the vanadyl phthalocyanine varies over substantially the whole thickness of the layer, from a value at the substrate interface which is at least 10% above the entire layer average density, to a value of the air interface which is at least 10% below the entire layer average density, said average layer density being any value not less than 10%, and not greater than 90% of the maximum bulk density of the vanadyl phthalocyanine.

18. An optical recording medium according to claim 16 wherein said layer exhibits a complex refractive index gradient along the direction perpendicular to the plane of the layer before laser exposure, and wherein said layer has a suitably large imaginary component of refractive index (k greater than or equal to 0.1) at the desired writing laser wavelength to enable thermally converting the initially inhomogeneous physical microstructure to a less inhomogeneous microstructure after exposure to electromagnetic radiation such that over substantially the whole layer thickness, the density is constant to within 10% of the entire average layer density, said average layer density being any value not less than 10%, and not greater than 90% of the maximum bulk layer material density.

19. An optical recording disc assembly for recording electromagnetic radiation comprising first and second transparent substrates, a fist optical recording medium according to claim 1 being coated on at least one surface of said first substrate and a second optical recording medium according to claim 9 being coated on at least one surface of said second substrate, said first optical recording medium being configured to face said second optical recording medium, and wherein said first optical recording medium is separated from the surface of said second optical recording medium by a gap of at least two wavelengths within the range of said electromagnetic radiation.

20. The method according to claim 9 wherein at least 50% of said molecules of the organic layer are preferentially oriented.

21. A method for preparing an optical recording medium comprising the step of vapor depositing onto a substrate of layer of multi-grain crystalline vanadyl phthalocyanine capable of absorbing electromagnetic radiation and having a minimal thermal stability such that said vanadyl phthalocyanine can be evaporated or sublimed under a pressure of 0.1 mTorr or less, without decomposition, by heating to at least 100° C, wherein the deposition rate of said vanadyl phthalocyanine is controlled at a rate in the range of 0.125 to 1.66 $\mu g/cm^2$-min. so as to obtain a layer whose physical microstructure is uniaxially anisotropic.

22. The method according to claim 21 further comprising the step of writing on said medium with electromagnetic radiation to provide recorded information on said medium.

23. A method for preparing an optical recording medium comprising the step of vapor depositing onto a substrate a layer of vanadyl phthalocyanine capable of absorbing electromagnetic radiation and having a minimal thermal stability such that said vanadyl phthalocyanine can be evaporated or sublimed under a pressure of 0.1 mTorr or less, without decomposition, by heating to at least 100° C, wherein the substrate temperature during said deposition is maintained at a temperature in the range of −5 to less than 25° C so as to obtain a layer of vanadyl phthalocyanine whose physical microstructure is uniaxially anisotropic.

24. A method of recording information in which a recording medium is exposed to electromagnetic radiation to receive information wherein said recording medium comprises a substrate having on at least one surface thereof at least one layer of organic material capable of absorbing electromagnetic radiation and comprising nonspherical molecules, said organic material prior to exposure to said radiation having a physical microstructure which is uniaxially anisotropic such that at least 10% of all the molecules of the organic material are uniformly preferentially oriented within 35 15 degrees of an arbitrary angle relative to the plane of the layer and providing to said layer a refractive index profile which is anisotropic with respect to the direction perpendicular to the plane of the layer before exposure to radiation, and upon exposure to electromagnetic radiation reducing the level of anisotropy of the exposed portions of the layer such that at least 5% fewer of the molecules remain preferentially oriented without thermal deformation or ablation of the exposed portions of the layer.

25. A pre-recorded optical recording medium prepared according to the method of claim 24.

* * * * *